US006186177B1

(12) United States Patent
Maher

(10) Patent No.: US 6,186,177 B1
(45) Date of Patent: Feb. 13, 2001

(54) INTEGRATED GAS DELIVERY SYSTEM

(75) Inventor: Joseph Maher, Wenham, MA (US)

(73) Assignee: MKS Instruments, Inc., Andover, MA (US)

( * ) Notice: Under 35 U.S.C. 154(b), the term of this patent shall be extended for 0 days.

(21) Appl. No.: 09/339,083

(22) Filed: Jun. 23, 1999

(51) Int. Cl.[7] ........................................ F16K 11/10
(52) U.S. Cl. ........................................ 137/884; 137/613
(58) Field of Search ........................................ 137/271, 613, 137/884

(56) References Cited

U.S. PATENT DOCUMENTS

| | | | | |
|---|---|---|---|---|
| 4,672,997 | | 6/1987 | Landis et al. | 137/554 |
| 5,062,446 | | 11/1991 | Anderson | 137/468 |
| 5,129,418 | | 7/1992 | Shimomura et al. | 137/486 |
| 5,357,811 | | 10/1994 | Hoang | 73/861.38 |
| 5,394,755 | | 3/1995 | Sudo et al. | 73/861 |
| 5,441,076 | * | 8/1995 | Moriya et al. | 137/486 |
| 5,605,179 | | 2/1997 | Strong, Jr. et al. | 137/884 |
| 5,662,143 | | 9/1997 | Caughran | 137/884 |
| 5,684,245 | | 11/1997 | Hinkle | 73/3 |
| 5,732,744 | | 3/1998 | Barr et al. | 138/106 |
| 5,819,782 | | 10/1998 | Itafuji | 137/240 |
| 5,836,355 | | 11/1998 | Markulec et al. | 137/884 |
| 5,863,023 | | 1/1999 | Evans et al. | 251/63.5 |
| 5,865,205 | | 2/1999 | Wilmer | 137/2 |
| 5,868,159 | | 2/1999 | Loan et al. | 137/334 |
| 5,988,217 | * | 11/1999 | Ohmi et al. | 137/614.2 |
| 5,992,463 | * | 11/1999 | Redemann et al. | 137/884 |
| 6,086,016 | * | 5/2000 | Manofsky, Jr. et al. | 137/884 |

* cited by examiner

*Primary Examiner*—John Fox
(74) *Attorney, Agent, or Firm*—McDermott, Will & Emery

(57) ABSTRACT

A gas delivery system comprises a common mounting block that supports the components in a predetermined arrangement and defines passageways between components so that a gas can flow through the passageways and components along a predetermined flow path. The mounting block is formed so that at least a portion of at least one mechanical part of at least one component is provided in the block, the passageways connect the components together and the remaining portion of each component not formed in the block is removably attached to the block. The electrical circuitry that is used to operate the components is separately provided remote from the components so that replacement of a component replaces those mechanical parts of the components not provided in the block, without requiring the replacement of the electrical components. Finally, a time sharing signal distribution circuit can be used to share electrical control and processing circuits with the components of a plurality of gas sticks of a gas box delivery system.

13 Claims, 5 Drawing Sheets

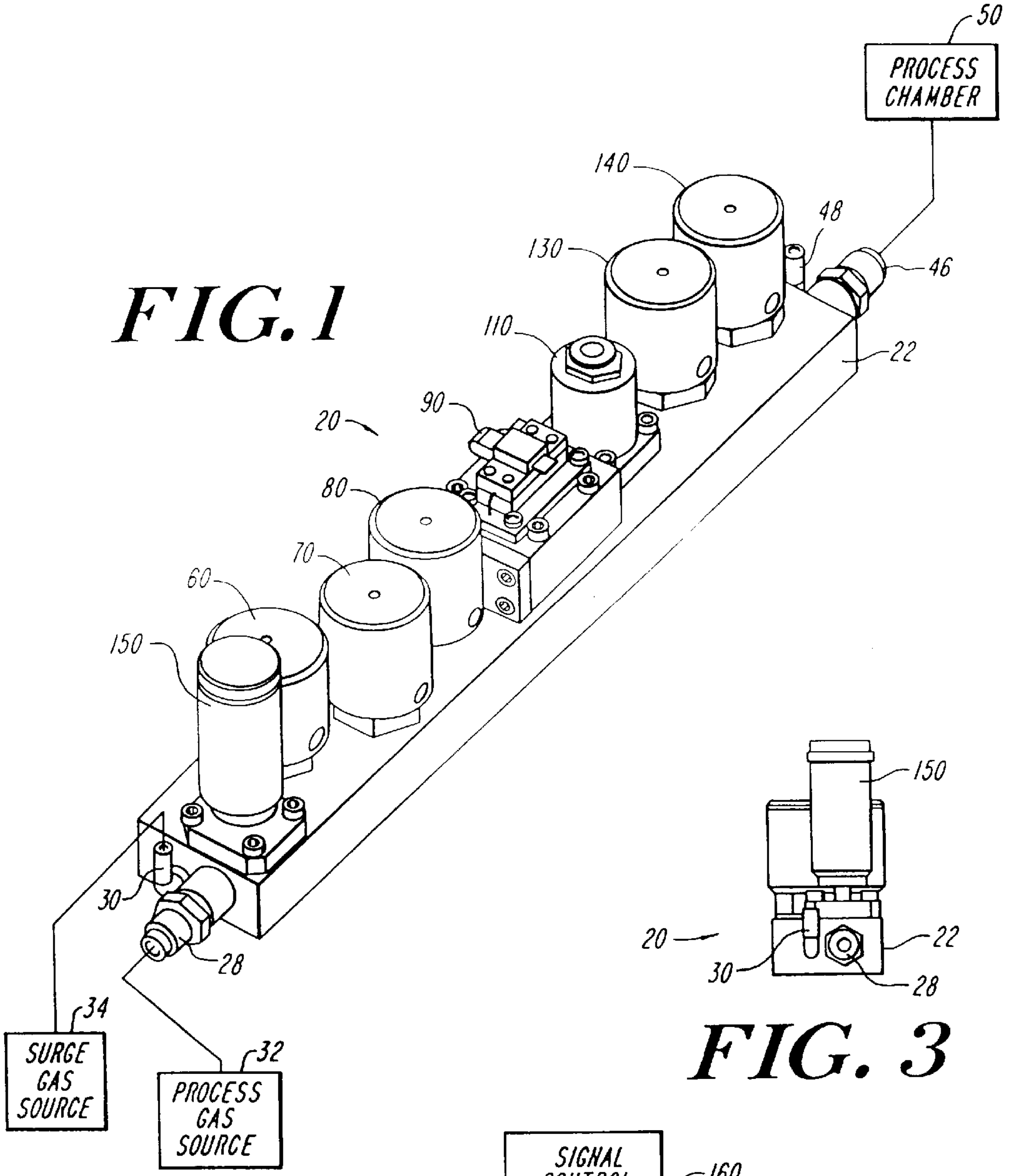
FIG. 1
FIG. 3
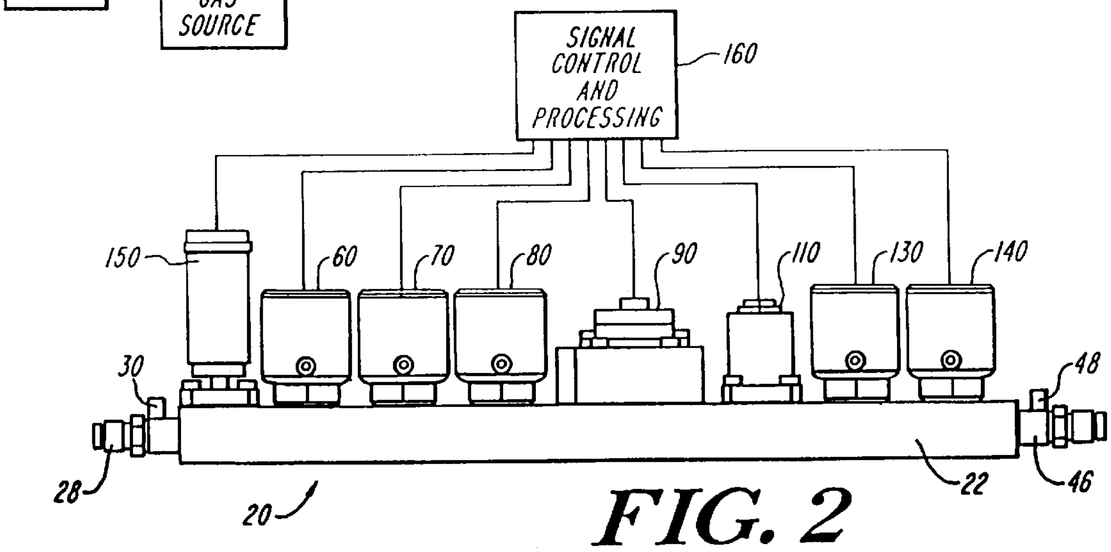
FIG. 2

INTEGRATED GAS DELIVERY SYSTEM

FIELD OF THE INVENTION

The present invention relates to gas delivery systems for ultra-high purity gases, such as systems used to provide process gases for semiconductor manufacturing. As used herein, the term "gas" includes gases and vapors.

BACKGROUND OF THE INVENTION

High purity gas delivery systems, such as those used in semiconductor manufacturing or other thin film coating processes, typically include a source of high purity gas coupled through a series of gas distribution and control components such as a mass flow controller, one or more pressure sensors and/or regulators, a heater, one or more filters or purifiers, and shutoff valves. In semiconductor processing, a series-connected set of such components is usually referred to as a "gas stick". The components used and their particular arrangement in a gas stick can vary depending upon their design and application, with many component arrangements being known in the art. In a typical semiconductor processing arrangement, multiple gas sources are connected to the chamber through multiple gas sticks, which are typically mounted to a frame, forming a complete system known as "gas box". See, for example, U.S. Pat. Nos. 5,662,143; 5,819,782 and 5,863,023.

As the dimensions of semiconductor devices decrease and their densities increase, semiconductor manufacturing processes have become increasingly intolerant of particulate contamination. One important source of such contamination is the gases used during the process, and particularly particulates carried by the wetted surfaces in the passageways through the components and those connecting the components of the gas stick which delivers gas from the source to the chamber. Moisture or dust which accumulates within a gas stick or component will be carried with the source gas and deposit onto the semiconductor devices being processed, creating defects. Moisture also may corrode the wetted surfaces, leading to flaking of particles from these surfaces.

To reduce contamination of this sort, gas sticks and other gas processing components used in manufacturing semiconductor devices are usually made in low-dust, low-moisture environments, and purged for lengthy periods of time at elevated pressures after manufacture. The components are then typically packaged and sealed in pressurized nitrogen for shipment. As a result, the interior of the component or stick is exposed only to the clean room environment in which the semiconductor processing equipment is located, and only for the brief period of time between removal of the packaging and sealing of the stick or component into the processing equipment.

In addition, the gas processing components in a gas stick, and other components and connections in the gas distribution system, will wear and need replacement at various times throughout the life of the assembly of equipment. Typically, a component is replaced by closing the valves most nearly adjacent to the component, uncoupling and replacing the component, and reopening the adjacent valves. To simplify this operation and minimize the extent of the gas stick exposed to room air during this procedure, each component is typically connected to its neighboring components or tubing with removable couplers, and valves are placed between components at several locations along the stick. This tubing and the removable couplers can often be the source of leaks, and require careful attachment and detachment when repairing and/or replacing component parts. Further, the act of uncoupling a component or portion of the stick and removing it from the stick exposes that component and the replacement component to ambient conditions, and also exposes substantial wetted surface between the component and the nearest valves (including the inside of any connecting tubing, and potentially other components), to ambient conditions. Thus, the gas stick must be extensively purged when the components are reassembled.

One approach to eliminating connection parts, such as tubing and couplers, and facilitating maintenance of the components of the gas stick is to "down mount" the components on multiple fixing blocks, as shown, for example, in U.S. Pat. No. 5,819,782 (Itafuji). However, each component of a gas stick typically comprises highly machined parts and expensive electrical circuitry, making each component relatively expensive to manufacture and replace. When a component fails, the entire component is replaced even though in most instances the failure is mechanical (and in the case of a mass flow sensor, it is the sensor that usually fails). Each component is typically constructed with a mounting block, which in turn is made with multiple machine operations, making the component expensive. Thus, while down mounting the component parts on multiple fixing blocks solves one problem, it still is relatively expensive to replace defective parts.

SUMMARY OF THE INVENTION

In accordance with the present invention, an improved gas delivery system designed and constructed so as to reduce the overall size and cost of the system, and yet increase the reliability of the system and allow inexpensive and easy repairs to and replacement of component parts. One design criterion is to make the total path length, or footprint, of the flow of gas as short as possible so as to minimize the wetted surface area to which the gas is exposed.

In accordance with one aspect of the invention, a gas delivery system comprises: a plurality of components including mechanical parts; and a common mounting block that supports the components in a predetermined arrangement and defines passageways between the components so that a gas can flow through the passageways and components along a predetermined flow path. The mounting block is formed so that at least a portion of at least one mechanical part of at least one component is provided in the block, the passageways connect the components together, and the portion of each component not formed in the block is removably attached to the block.

In one embodiment, the electrical control and processing circuitry used to operate each of the components are separately provided so that replacement of a component replaces those mechanical parts of the components not provided in the block, without requiring the replacement of the circuitry.

In another embodiment, at least one of the components is a valve; and the portion of at least one mechanical part is a valve seat machined into said block.

In another embodiment, at least one of the components is a mass flow sensor of a mass flow meter. The mass flow meter can be any type including temperature-based and pressure based flow meters.

In another embodiment, the block includes at least two substantially parallel passageways formed in a surface of the block, and a cover is secured over each of the passageways and sealed thereto so as to form a sealed fluid flow path through the passageway.

In accordance with another aspect of the invention, a gas delivery system comprises: a plurality of components including mechanical parts arranged so as to control the flow of gas from a source to a process chamber; and electrical control and processing circuits that are used to operate the components; wherein the electrical control and processing circuits are separately provided remote from the components so that replacement of a component replaces those mechanical parts of the components, without requiring the replacement of the electrical circuitry.

In accordance with one embodiment of the present invention, at least one of the components is a mass flow meter of a mass flow controller that provides a mass flow signal as a function of the gas flowing through the meter. In one embodiment, at least one of the components is a control valve responsive to a control signal provided by the electrical control and processing circuitry.

In accordance with another aspect of the invention, a gas box delivery system comprises: a plurality of gas sticks, each comprising a plurality of components including mechanical parts arranged so as to control the flow of gas from a source to a process chamber; electrical control and processing circuits that are used to operate the components; and a time sharing signal distribution circuit that allows the electrical control and processing circuits to be shared with each of the gas sticks.

In one embodiment, the electrical control and processing circuits are separately provided remote from the components so that replacement of a component replaces those mechanical parts of the components, without requiring the replacement of the electrical circuitry.

In accordance with one embodiment, at least one of the components of each gas stick is a mass flow meter that provides a mass flow signal as a function of the gas flowing through the meter. In one embodiment, at least one of the components of each gas stick is a control valve responsive to a control signal provided by the electrical control and processing circuitry.

BRIEF DESCRIPTION OF THE DRAWINGS

FIG. 1 is an isometric view of one embodiment of a gas stick constructed and arranged in accordance with principles of one aspect of the present invention;

FIG. 2 is a side view of the FIG. 1 embodiment;

FIG. 3 is an end view of the FIG. 1 embodiment;

DETAILED DESCRIPTION OF THE DRAWINGS

Figure 4:
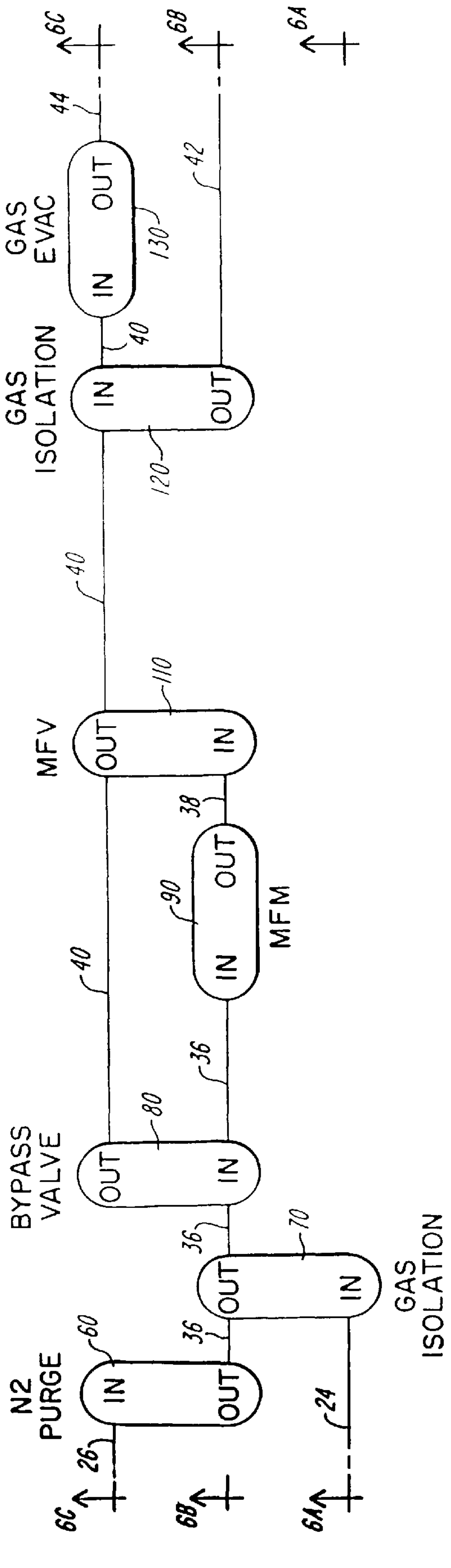
FIG. 4 is a schematic view showing the connections provided by the passageways in the common mounting block of the FIG. 1 embodiment.

Referring to FIGS. 1–6, a gas stick is arranged and constructed in accordance with the principles of one aspect of the present invention. The components used and their particular arrangement in a gas stick can vary depending upon their design and application, with many component arrangements being known in the art. Thus, the present invention is not limited to the particular arrangement shown in the drawings and described hereinafter. In the embodiment shown in FIGS. 1–6, and as illustrated by the schematic of FIG. 4, the gas stick 20 includes common block 22, and a plurality of components adapted to be easily and quickly mounted on the block. First and second gas inlet passageways 24 and 26 (see FIGS. 4, 5, 6A and 6C) are provided in the block 22. As seen in FIGS. 1–3, 6A and 6C, the inlet passageway 24 includes an inlet port connector 28 designed to be connected directly or indirectly through other components to a source of the process gas (indicated generally at 32 in FIG. 1). The inlet passageway 26 includes an inlet port connector 28 designed to be connected to a source of purge gas (indicated generally at 34 in FIG. 1), such as nitrogen, for purging the passageways of the common block, as well as the passageways through the individual components.

Figure 6A:
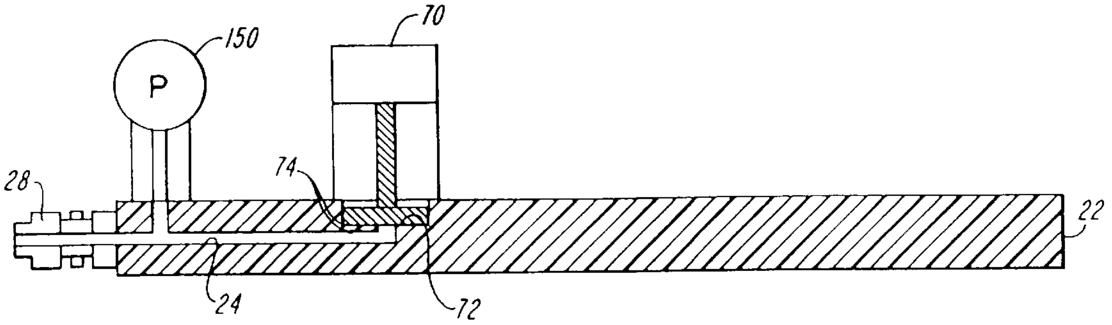
FIGS. 6A–6C show cross sectional views through the block along the lines A—A, B—B and C—C referenced in FIGS. 4 and 5, and illustrating the passageways through the common mounting block of the FIG. 1 embodiment.
Figure 6B:
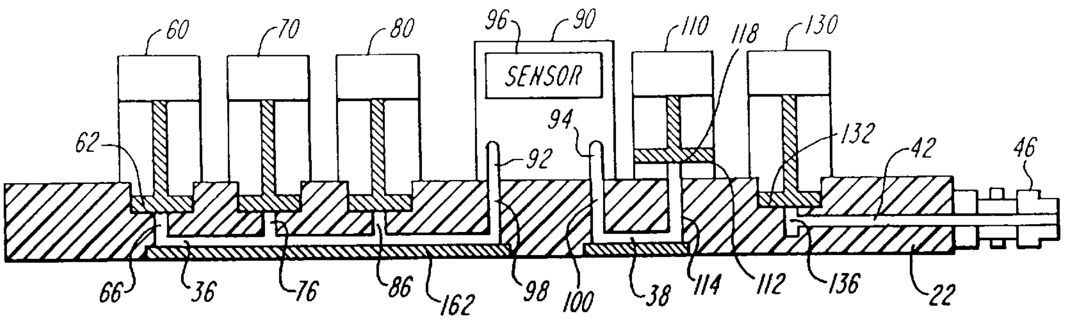
Figure 6C:
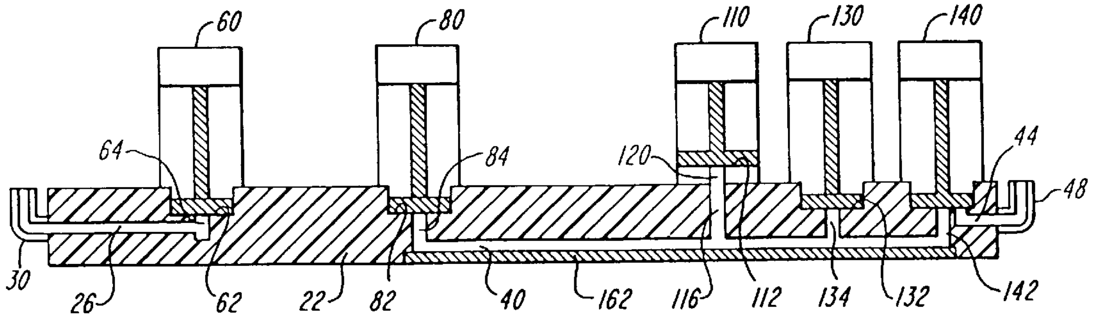

As seen schematically in FIG. 4 and in cross section in FIGS. 6B and 6C, the block 22 further comprises first, second and third horizontal connecting passageways 36, 38 and 40 formed in the bottom surface of the block 22, and first and second outlet passageways 42 and 44. As best seen in FIGS. 1, 6B and 6C, the outlet passageway 42 includes an outlet port connector 46 designed to be connected through a suitable connection, either directly or indirectly through one or more other components, to a process chamber (indicated at 50 in FIG. 1) to which the process gas is to be delivered. The outlet passageway 44 includes an outlet port connector 48 which is either exposed to the ambient atmosphere (or preferably connected to a suitable reservoir (not shown) or other storage device) for the purging gas after it is passed through the passageways of the block and the components mounted thereto.

Figure 5:
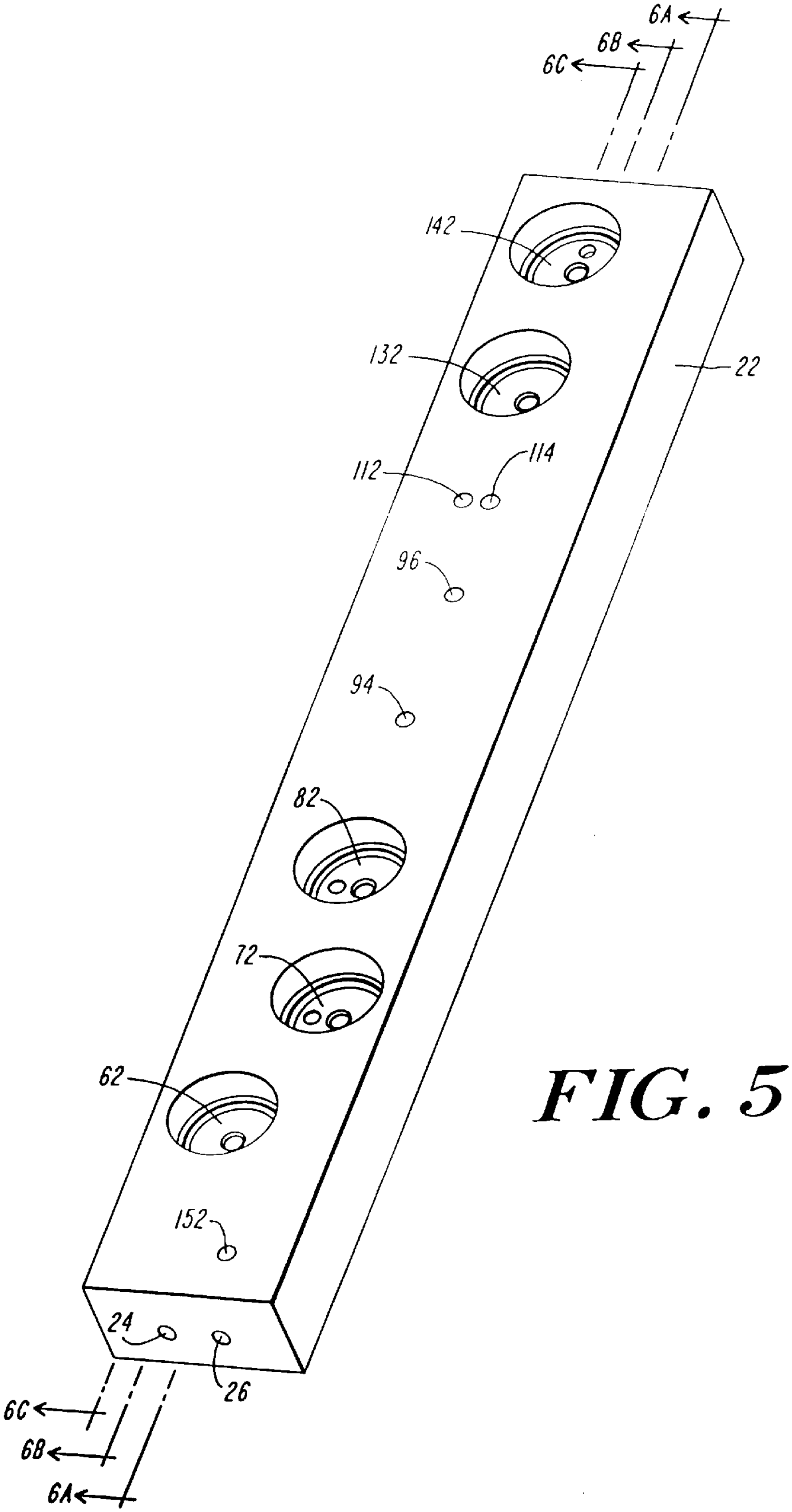
FIG. 5 is an isometric view of the common mounting block of the FIG. 1 embodiment showing the top of the block.

In the arrangement shown in FIGS. 1–3 and 6A–6C, a first shutoff (purge) valve 60 is mounted to the top surface of the block 22. As best seen in FIG. 5, the block 22 is preferably machined to include a first component station having a valve seat 62 with a vertical inlet passageway 64 in fluid communication with the inlet passageway 26 (see FIG. 6C), and a vertical outlet passageway 66 (see FIG. 6B) in fluid communication with the horizontal connecting passageway 36.

As seen in FIGS. 1–3 and 6A–6C, a second shut off (gas isolation) valve 70 is also mounted to the top surface of the block 22. As best seen in FIG. 5, again the block 22 is preferably machined to include a second component station having a valve seat 72 with a vertical inlet passageway 74 in fluid communication with the inlet passage 24 (see FIG. 6A), and a vertical outlet passageway 76 in fluid communication with the connecting passageway 36 (see FIG. 6B).

In addition, as seen in FIGS. 1–3 and 6A–6C, a third shut off (bypass valve) valve 80 is also mounted to the top surface of the block 22. As best seen in FIG. 5, again the block 22 is preferably machined to include a third component station having a valve seat 82 with a vertical inlet passageway 84 in fluid communication with the connecting passageway 40 (see FIG. 6C), and a vertical outlet passageway 86 in fluid communication with the connecting passageway 36 (see FIG. 6B).

A mass flow meter 90 is mounted on the top surface of the block. The mass flow meter 90 includes a gas inlet port 92 and a gas outlet port 94 preferably connected to one or more components (not shown) and provided with a mass flow sensor 96 for sensing the flow of gas through the mass flow meter. The mass flow meter can be any type, such as a thermal based mass flow meter, or a pressure based mass flow meter. The block 22 is machined so as to include a fourth component station having a vertical inlet passageway 98 (shown in FIGS. 5 and 6B), forming the inlet to the gas inlet port 92, and a vertical outlet passageway 100, forming the outlet to the outlet port 94 (see FIGS. 5 and 6B). The inlet passageway 94 provides fluid communication between the inlet of the meter 90 and the connecting passageway 36, while the vertical outlet passageway 100 provides fluid communication between the outlet of the flow meter 90 and the connecting passageway 38.

Where the gas stick 20 is utilized to control the flow of mass delivered to a process chamber, a control valve 110 is also provided on the top surface of the block. The control valve is adapted to control the flow of gas through the gas stick to the chamber, as a function of the flow sensed by the sensor 96. Where precise control is desired, control valve 110 is preferably preassembled so as to include its own valve seat 112 with a fifth component station having a vertical inlet passageway 114 and vertical outlet passageway 116 formed in the block 22 in fluid communication respectively with the inlet and outlet ports 118 and 120 of the control valve 110 (see FIGS. 6B and 6C). Vertical inlet passageway 114 is in fluid communication with the connecting passageway 38, while the vertical outlet passageway 116 is in fluid communication with the connecting passageway 40.

As seen in FIGS. 1, 2, 4, 6B and 6C, a third shut off (gas isolation) valve 130 is also mounted to the top surface of the block 22. Again the block 22 is preferably machined to include a sixth component station having a valve seat 132 (see FIG. 5) with a vertical inlet passageway 134 in fluid communication with the connecting passageway 40, and a vertical outlet passageway 106 in fluid communication with the outlet passageway 42.

Finally, a fourth shut off (gas evacuation) valve 140 is also mounted to the top surface of the block 22. Again the block 22 is preferably machined to include a seventh component station having a valve seat 142 with a vertical inlet passageway 144 in fluid communication with the connecting passageway 40, and a vertical outlet passageway 146 in fluid communication with the outlet passageway 44.

As seen in FIGS. 1–3, and 6A, pressure sensor 150 is also preferably mounted on the top surface of the block 22, with the block being machined so as to provide the gas passageway 152 for preferably providing fluid connection between the pressure sensor 150 and the inlet passageway 24 (see FIG. 6A). This provides a measure of pressure from the source, although the sensor can be provided at other locations along the path of the flow of gas, or additional pressure sensors can be provided to measure pressure at specific locations.

While the connection of the block 22 to the mass flow meter 90, the shut off valve 110, and pressure sensor 150 is similar to down mounting, the block 22 includes the valve seats for each of the shut off valves 60, 70, 80, 130 and 140 and also provides the inlet and outlet passageways for each of the components mounted on a single block. Each shut off valve 60, 70, 80, 130 and 140 is provided with a valve body, and operates in one of two modes, an open and closed position, in response to one of two states of a control signal applied to the particular valve. The valve body of each control valve 110 moves between an open and closed position in response to a control signal so as to control the mass flow through the valve 110 as a function of the control signal. The control signal is a function of an electrical output generated by sensor 96 and representative of the mass flow through the mass flow meter 90.

In accordance with one aspect of the invention, the electrical circuits for generating the control signals to the shut off valves 60, 70, 80, 130 and 140, the processing circuitry for processing the output from the sensor 100, and the electrical circuit for generating the control signal to the control valve 110 as a function of the mass flow sensed by the sensor 96 can all be remote (as indicated generally at 160 in FIG. 1) from the components themselves, with simple electrical connections being made from these circuits to the individual components. This allows replacement of the components with components that are less expensive than the complete components which are packaged with machined parts and electrical circuits.

It should be appreciated that the part of each component not formed in the block is removably attached to the block by any suitable means so as to provide a gas tight seal. In addition, the connecting passageways 36, 38 and 40 can be formed in the bottom surface of the mounting block 22, and suitable plates 162 can be used to cover the passageways, and secured in place so as to provide gas tight seal.

Figure 7:
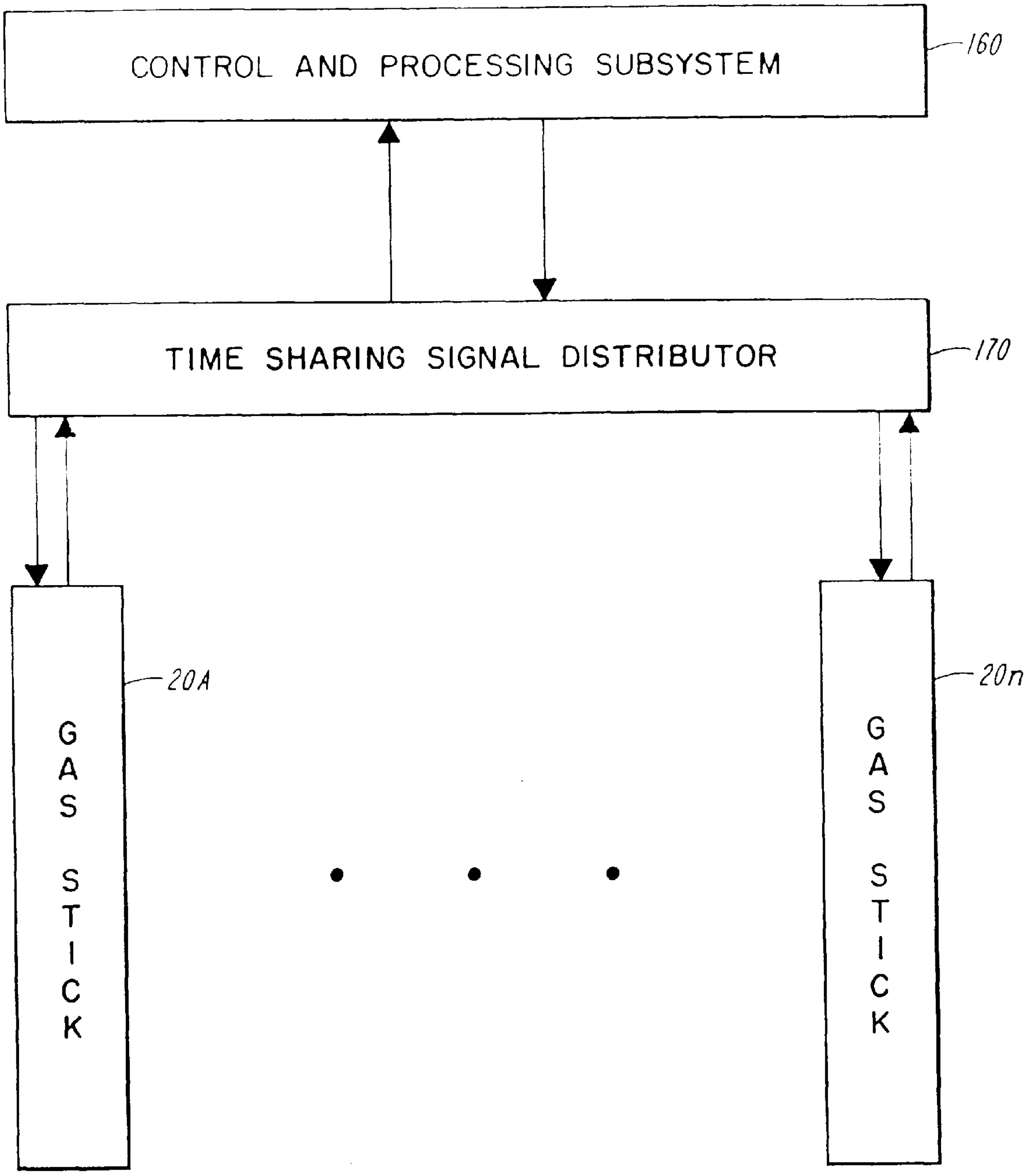
FIG. 7 shows a block diagram of a preferred embodiment of a gas box designed according to one aspect of the present invention.

In addition, in accordance with one aspect of the invention, as shown, in FIG. 7, multiple gas sticks 20A . . . 20*n* (where n represents any number of sticks) can be assembled and controlled by a control and processing subsystem unit 170. If desired, control and process subsystem 170 can shared by the gas sticks, and a time sharing signal distribution circuit 180 can be provided for multiplexing and/or demultiplexing the flow of control and processing signals to and from the individual gas sticks.

Because certain changes may be made in the above apparatus without departing from the scope of the invention herein disclosed, it is intended that all matter contained in the above description or shown in the accompanying drawings shall be interpreted in an illustrative and not a limiting sense.

What is claimed is:

1. A one-piece mounting block for supporting and connecting components of a gas delivery system, comprising:

opposing first and second end surfaces;

top and side surfaces extending between the opposing end surfaces;

inlet passageways extending from the first end surface in a direction generally towards the second end surface, the inlet passageways being separately connectable to a source of purge gas and a source of process gas;

outlet passageways extending from the second end surface of the block in a direction generally towards the first end surface, the outlet passageways being separately connectable to a process chamber and a purge reservoir;

a plurality of gas component stations spaced on the top surface between the end surfaces, wherein each of the inlet and the outlet passageways is connected to at least one of the component stations; and connecting passageways within the block extending generally parallel with the top surface, the connecting passageways connecting the component stations such that, when gas control components are mounted to the component stations of the block, gas flow can be directed from each inlet passageway to one of the outlet passageways, as desired.

2. A mounting block according to claim 1, wherein the connecting passageways are partially formed in a bottom surface of the block.

3. A mounting block according to claim 2, wherein at least one cover is secured to the bottom surface of the block to seal the connecting passageways.

4. A mounting block according to claim 1 wherein:

a first gas component station is connected to a first of the inlet passageways;

a second gas component station is connected to a second of the inlet passageways;

a first of the connecting passageways is connected to the first and second gas component stations;

a third gas component station is connected to the first connecting passageway;

a fourth gas component station is connected to the first connecting passageway;

a second of the connecting passageways is connected to the fourth gas component station;

a fifth gas component station is connected to the second connecting passageway;

a third of the connecting passageways is connected to the third and the fifth gas component station;

a sixth gas component station is connected to the third connecting passageway and a first of the outlet passageways; and a seventh gas component station is connected to the third connecting passageway and a second of the outlet passageways.

5. A mounting block according to claim 4, wherein the first and second connecting passageways are aligned with the first outlet passageway, and the third connecting passageway is aligned with the second inlet passageway and the second outlet passageway.

6. A mounting block according to claim 1, wherein at least one of the gas component stations has a surface recessed from the top surface of the block.

7. A mounting block according to claim 1, further comprising a port extending from the top surface of the block to one of the inlet passageways.

8. A gas delivery system comprising:

(A) a mounting block including (a) opposing first and second end surfaces;

(b) top and side surfaces extending between the opposing end surfaces;

(c) inlet passageways extending from the first end surface in a direction generally towards the second end surface, the inlet passageways being separately connectable to a source of purge gas and a source of process gas;

(d) outlet passageways extending from the second end surface of the block in a direction generally towards the first end surface, the outlet passageways being separately connectable to a process chamber and a purge reservoir;

(e) a plurality of gas component stations spaced on the top surface between the end surfaces, wherein each of the inlet and the outlet passageways is connected to at least one of the component stations; and (f) connecting passageways within the block extending generally parallel with the top surface, the connecting passageways connecting the component stations such that, when gas control components are mounted to the component stations of the block, gas flow can be directed from each inlet passageway to one of the outlet passageways, as desired; and (B) gas control components mounted to the component stations of the block, the gas control components controlling gas flow between the passageways of the block.

9. A gas delivery system according to claim 8, wherein electrical control and processing circuitry used to operate each of the components are positioned remotely from the block.

10. A gas delivery system according to claim 5, wherein at least one of the components is a valve.

11. A gas delivery system according to claim 10, wherein the valve is a cut-off valve.

12. A gas delivery system according to claim 10, wherein the valve is a control valve.

13. A gas delivery system according to claim 8, wherein at least one of the components is a mass flow sensor of a mass flow meter.

* * * * *